United States Patent [19]

Scott

[11] Patent Number: 5,171,034
[45] Date of Patent: Dec. 15, 1992

[54] TRAILER FOR TWO-WHEELED VEHICLE

[76] Inventor: James R. Scott, 116 Glendale Ave., Glen Burnie, Md. 21061

[21] Appl. No.: 714,713

[22] Filed: Jun. 13, 1991

[51] Int. Cl.⁵ .......................... B62J 7/04; B62D 63/06
[52] U.S. Cl. ..................... 280/204; 280/292; 280/494; 280/2
[58] Field of Search ..................... 280/204, 288.4, 292, 280/494, 32.7, 442, 472, 2, 78; 224/30 R, 32 A

[56] References Cited

U.S. PATENT DOCUMENTS

| 660,598 | 10/1900 | Stonebridge | 280/204 |
| 2,750,206 | 6/1956 | Sabato | 280/204 |
| 3,387,859 | 6/1968 | McClellan | 280/78 |
| 3,567,249 | 3/1971 | Robinson | 280/204 |
| 4,511,155 | 4/1985 | Galloway | 280/204 |
| 5,076,600 | 12/1991 | Fake | 280/204 |
| 5,098,113 | 3/1992 | Albitre | 280/204 |

Primary Examiner—David M. Mitchell
Assistant Examiner—Carla Mattis
Attorney, Agent, or Firm—Leonard Bloom

[57] ABSTRACT

A trailer for attachment to a two-wheeled vehicle. The trailer has a relatively low center of gravity and a single pivoting trailing wheel.

8 Claims, 5 Drawing Sheets

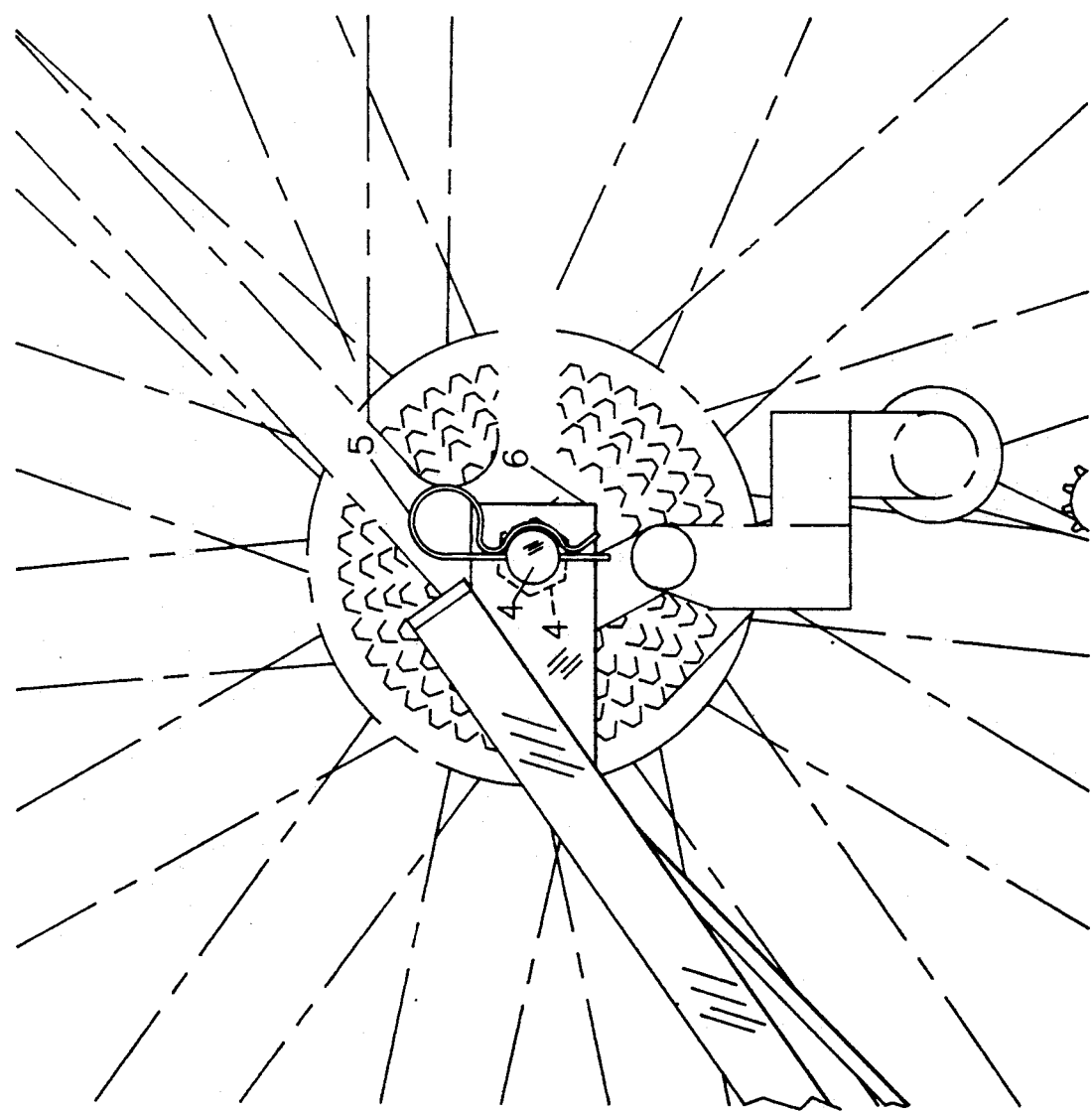

TRAILER FOR TWO-WHEELED VEHICLE

TECHNICAL FIELD OF THE INVENTION

This trailer may be used for carrying cargo or infants behind a two-wheeled vehicle such as a motorcycle, moped, or bicycle.

BACKGROUND OF THE INVENTION

Currently, infants or cargo are carried on two-wheeled vehicles on racks or seats which place the center of gravity of the child or cargo above the axis of the wheels of the vehicle. This makes the vehicles unstable and difficult to ride. The seats commonly used for transporting infants or young children on bicycles are particularly dangerous as, in addition to rendering the vehicle unstable, the child will fall several feet if the bicycle tips over. Trailers for two-wheeled vehicles have generally utilized dual wheels and a pivot at the front end of the trailer, which is an unstable and unmaneuverable design. Two wheel trailers present particular problems in cornering sharply. This invention responds to a long-felt need to develop a safe, stable, simple and durable design for a trailer for a two-wheeled vehicle.

SUMMARY OF THE INVENTION

The trailer I have devised is attached to the rear axle of the vehicle by a rigid frame, and the rear end of the trailer is supported by a single wheel which pivots as necessary to make turns. The bed of the trailer is significantly lower than the axle of the rear wheel of the bicycle, moped, or motorcycle, so that the load on the trailer will have a relatively low center of gravity, thus contributing to the stability of the vehicle.

BRIEF DESCRIPTION OF THE DRAWINGS

FIG. 5 depicts a detail of the method of attachment of the trailer to the rear axle of the vehicle.

DESCRIPTION OF THE EXEMPLARY FORM OF THE INVENTION SHOWN IN THE DRAWING

Figure 1:
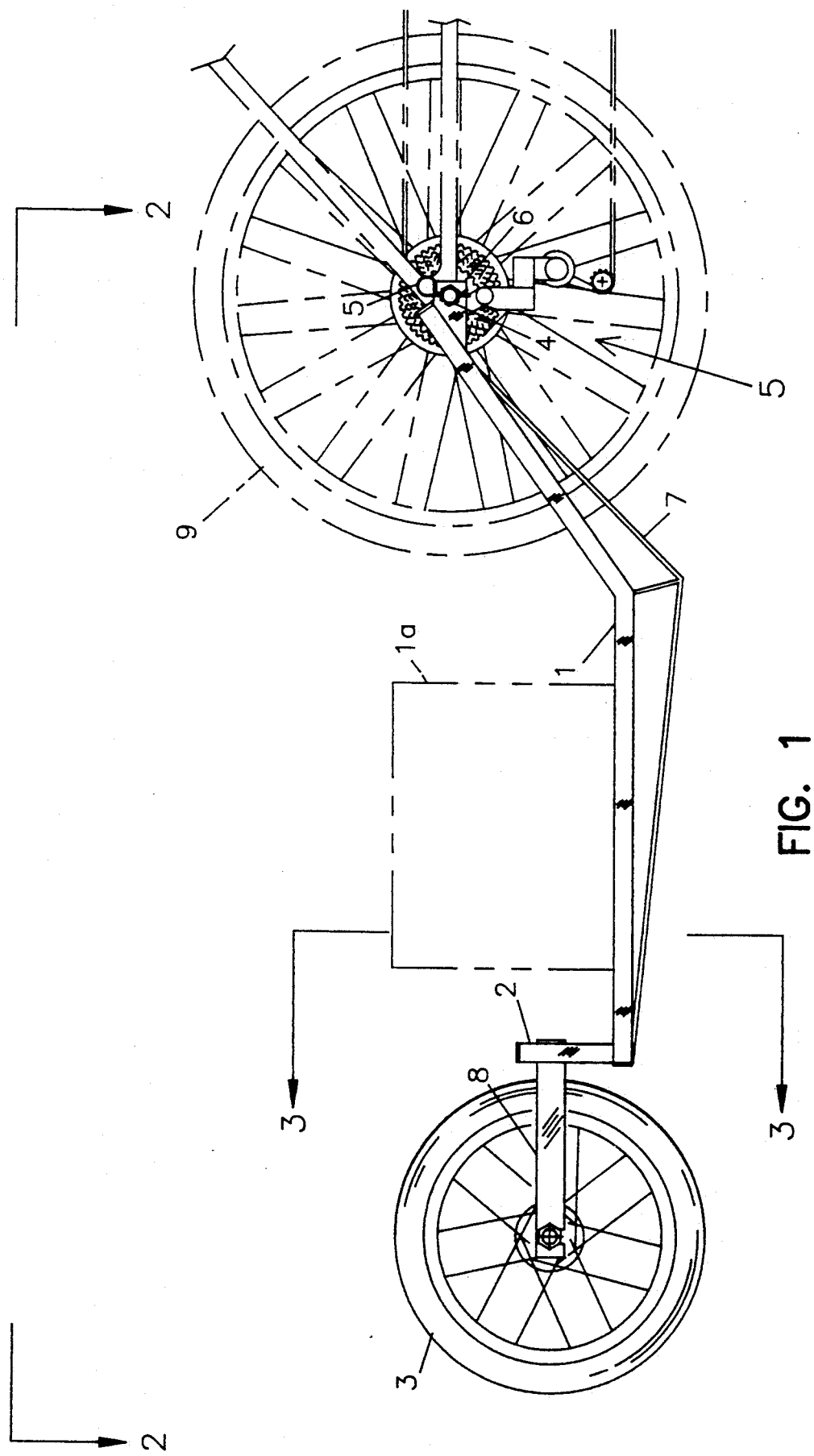
FIG. 1 shows a side view of the trailer attached to the rear wheel of a two-wheeled vehicle. The frame of the trailer (1), on which the load (1a) is carried, has at its rear a single wheel (3) which pivots about a vertical axis at the rear of the trailer bed (2), as is necessary to make turns. The wheel is attached to the pivot at the rear of the trailer bed (2) by means of two strips (8) running from the pivot to the axle of the trailing wheel (3), which strips are secured to the wheel axle with nuts. The frame (1) is reinforced with struts (7). The forward end of the frame is attached to the rear axle of the two-wheeled vehicle by means of two parallel connecting arms with holes at the forward end (6) which fit over the rear axle of the vehicle, which is modified (4) to permit the trailer to be secured by a pin (5), without interfering with the free motion of the rear wheel of the vehicle (9) and in such a manner as to permit some motion in the vertical plane about the axis of the point of attachment (4).
Figure 2:
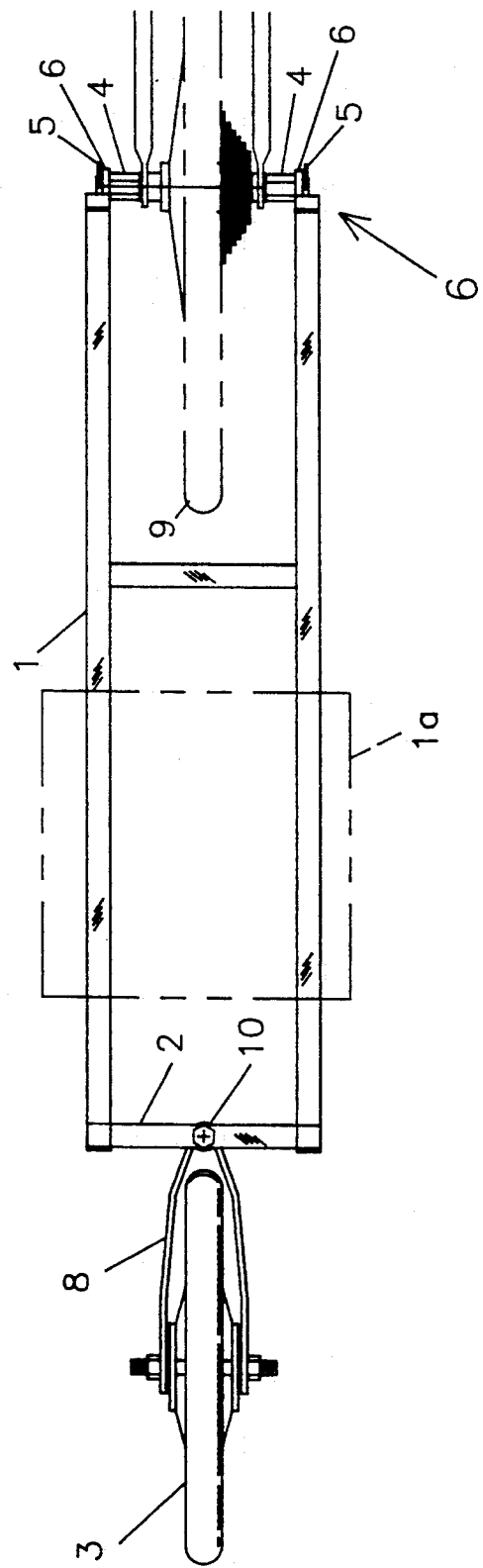
FIG. 2 shows a top view of the trailer attached to the vehicle, and shows more clearly the manner in which the trailer is attached to the vehicle and the pivot point (10) for the rear wheel of the trailer.
Figure 4:
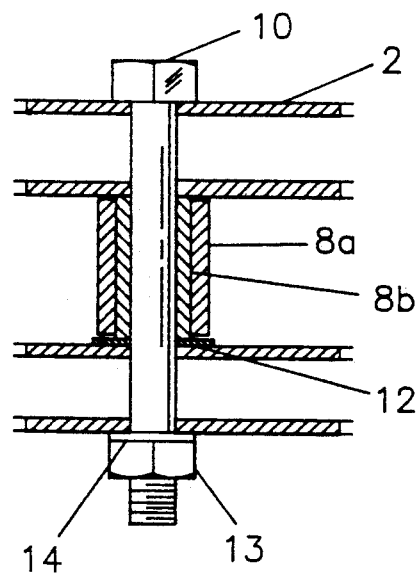
FIG. 4 depicts a cross section of the pivot apparatus. The arms (8a) which hold the trailing wheel are welded to a tube (8b) through which the pivot bolt (10) passes, anchoring the tube/arm (8a/8b) assembly to the horizontal support members (2) attached to frame of the trailer.
Figure 3:
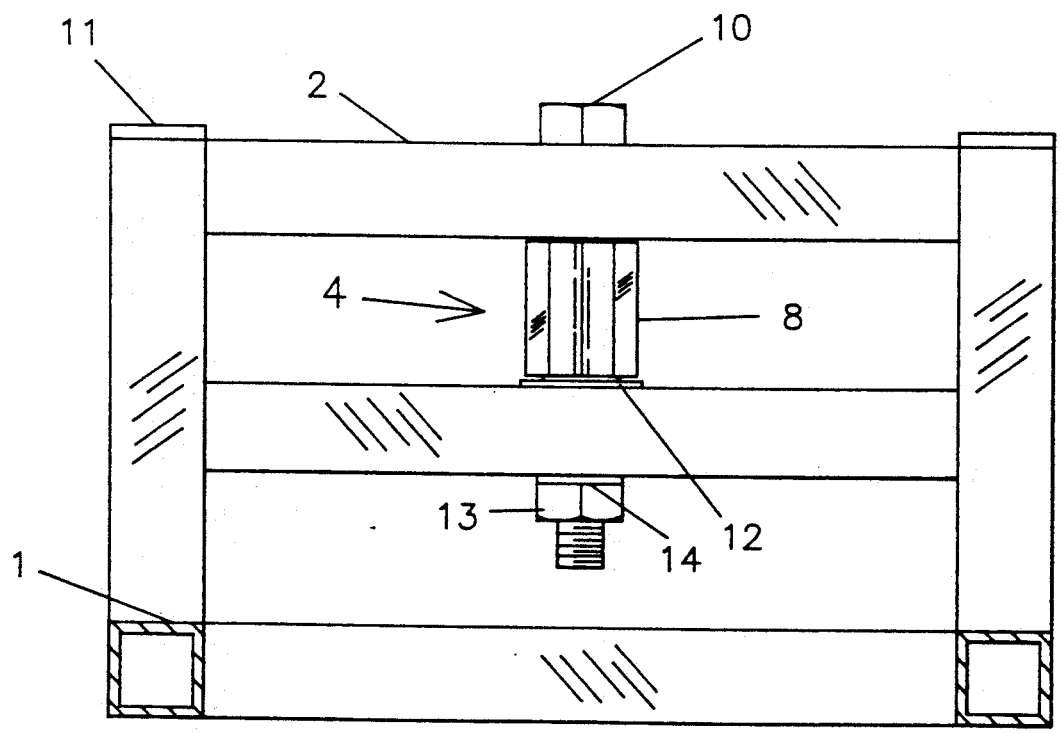
FIG. 3 is a detail of the pivot for the trailing wheel, showing the two arms (8) which attach to the axle of the trailing wheel and pivot about a bolt (10) secured by washers (12) and (14) and a nut (13). Two vertical support members capped with plastic plugs (11) are attached to the rear end of the bed of the trailer frame (1) and are spanned by horizontal support members (2) through which the bolt of the pivot (10) passes, thereby anchoring the pivot apparatus to the frame of the trailer.
Figure 6:
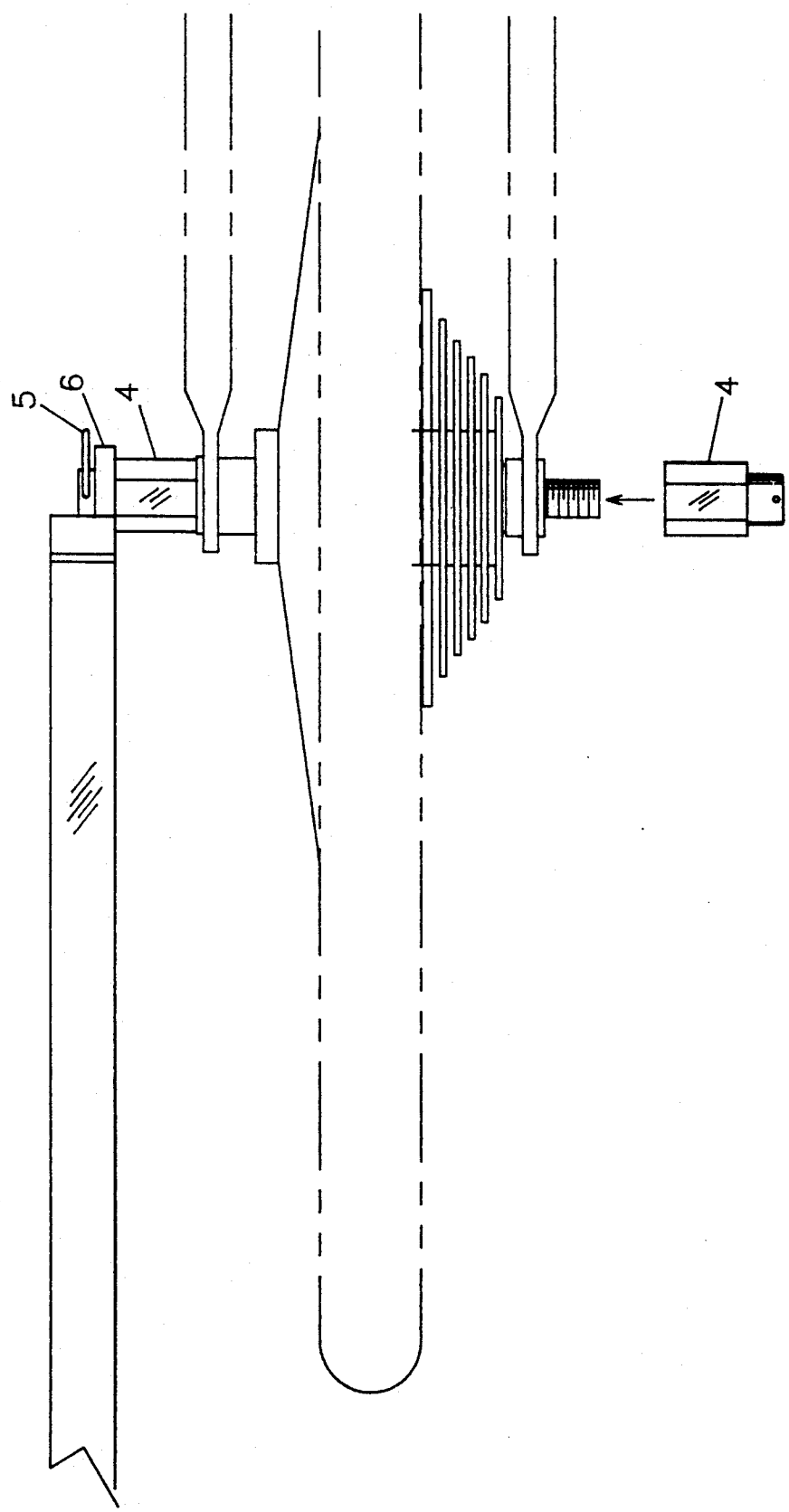
FIG. 6 shows a top view o-f the attachment of the trailer to the vehicle. The upper portion of the drawing shows one of the arms (6) of the trailer attached to the modified axle of the vehicle (4) and secured in place with a pin (5). The lower portion of the drawing shows a method by which the axle may be modified to accommodate the trailer, showing a modified threaded nut which may be screwed on to an existing axle to permit attachment of the trailer. The modified nut (4) has a small transverse hole in one end to permit insertion of a pin to anchor the attachment arm of the trailer, as shown at the top portion of the drawing.

The essential idea of the invention consists of a simple, durable design for a trailer with a single pivoting rear wheel and a low center of gravity for use with a two-wheeled vehicle. The trailer may be attached to the two-wheeled vehicle in various ways and the rear pivot of the trailer and the frame of the trailer may be configured in various ways without changing the essential idea of the invention. The preferred form of the invention is as depicted in the drawings.

The trailer may be made out of any hard material, but in the preferred form of the invention, the trailer is made out of steel. The frame of the trailer (1) is made of tubular steel for additional strength and is reinforced with steel struts (7). The parallel portion of the arms (8) which attach to the rear axle of the trailing wheel (3) of the trailer respectively should be spaced just wide enough to permit them to snap over the ends of the respective axle. The trailing wheel (3) is preferably a rubber tired bicycle-type wheel. Theoretically, the rear arms (8) holding the trailing wheel (3) could pivot through an arc of nearly 180°, but in actual practice, this arc may be much less without impairing the functioning and maneuverability of the trailer. The manner in which the load (1a) is attached to the trailer is not essential to this invention. The load could be placed in a basket or container welded or bolted to the frame of the trailer, or it could be tied or otherwise secured to the trailer. If the trailer is used to carry a child, a seat with a seat belt and harness or other appropriate restraining device may be screwed, welded or otherwise securely attached to the trailer so that the child can be transported without falling off.

I claim:

1. A trailer for attachment to, and use with, a two-wheeled vehicle, the two-wheeled vehicle having a pivotable front wheel and a non-pivotable rear wheel, said rear wheel being rotatable about a center axle, the trailer comprising in combination;

a frame having a horizontal bed having a front end and a rear end, means for connecting the front end of the horizontal bed to the two-wheeled vehicle;

vertical support members attached to the rear of the horizontal bed;

means attached to the vertical support members for pivotal movement about a vertical axis in a horizontal plane, said means extending rearwardly and substantially horizontally from the rear end of the horizontal bed;

a trailing wheel having a center axle permitting rotational movement of the trailing wheel about the axle, the trailing wheel being connected to the means attached to the vertical support members, the trailing wheel being pivotally moveable concomitantly with pivotal movement of said means, the trailing wheel being smaller than the rear wheel of the two-wheeled vehicle whereby the axle of the trailing wheel is lower than the axle of said rear wheel, the horizontal bed being lower than the axle of the trailing wheel and the horizontal bed being disposed between the rear wheel of the two-wheeled vehicle and the trailing wheel.

2. The trailer of claim 1, further comprising a pair of parallel connecting arms extending upwardly at an angle from the front end of the horizontal bed, each connecting arm having an end distal from the horizontal bed, means for attaching the respective ends of the connecting arms to the axle of the rear wheel of the two-wheeled vehicle; and opening formed in each of the respective ends of the connecting arms, two modified nuts, each nut being threadably attached to the axle of the rear wheel of the two-wheeled vehicle on each respective end of said axle, each nut having an outer surface having a hexagonally-shaped inner edge and an outer edge shaped to cooperate with and be received in the respective openings in the ends of the connecting arms of the frame thereby securing the trailer to the two-wheeled vehicle.

3. The trailer of claim 2, further comprising each nut having a transverse opening formed in the outer edge, a respective pin means being received in each of said transverse openings, wherein the respective connecting arms of the trailer may be secured on the respective nuts between the inner edge of the nut and said pins and removal of said connecting arms from the axle of said rear wheel is prevented.

4. The trailer of claim 2, wherein the outer edge of each respective nut is circularly shaped and the openings in the ends of the respective connecting arms are circular, wherein, when the outer ends of the respective nuts are received in the respective openings, motion of the trailer in a vertical plane about the axle of the rear wheel is permitted.

5. A trailer for attachment to, and use with, a two-wheeled vehicle, the two-wheeled vehicle having a pivotable front wheel and a non-pivotable rear wheel, said rear wheel being rotatable about a center axis, the trailer comprising, in combination:

a frame having a horizontal bed having a front end and a rear end, a pair of parallel connecting arms extending upwardly at an angle from the front end of the horizontal bed and straddling the axle of said rear wheel, each arm having an end distal from the horizontal bed, an opening formed in each of the respective ends of each connecting arm, means for securing said openings to the axis of the rear wheel of the two-wheeled vehicle, wherein the horizontal bed of the frame is lower than said axle and said rear wheel may rotate without interference;

a pair of spaced-apart arms extending rearwardly and substantially horizontally from the rear end of the horizontal bed, at lest a portion of each of the spaced-apart arms being substantially parallel to one another, said arms being pivotally connected to the rear end of the horizontal bed, wherein said arms may pivot freely about a vertical axis in a horizontal plane;

a trailing wheel having an axle, said axle being connected between the substantially parallel portions of the rearwardly extending arms, wherein the trailing wheel may rotate freely and may pivot when the arms pivot, and the horizontal bed being lower than the axle of the trailing wheel.

6. The trailer of claim 5, wherein two modified nuts are threadably attached to the axis of the rear wheel of the two-wheeled vehicle on each respective end of said axle, each nut having an outer surface having a hexagonally-shaped inner edge and a circularly-shaped outer edge, wherein when the respective nuts are attached to the axle, the circularly-shaped outer edge of each respective nut may be received in the respective openings in the ends of the connecting arms of the frame, thereby securing the trailer to the two-wheeled vehicle and permitting motion of the trailer in a vertical plane about said axle.

7. The trailer of claim 6, further comprising each nut having a transverse opening formed in the circularly-shaped outer edge, a respective pin means being received in each of said transverse openings, wherein the respective connecting arms of the trailer may be secured on the respective nuts between the hexagonally-shaped inner edge and said pins and removal of said connecting arms from the axle of said rear wheel is prevented.

8. A trailer for attachment to, and use with, a two-wheeled vehicle, the two-wheeled vehicle having a pivotable front wheel and a non-pivotable rear wheel, said rear wheel being rotatable about a center axle, the trailer comprising, in combination:

a frame having a horizontal bed having a front end and a rear end, a pair of parallel connecting arms extending upwardly at an angle from the front end of the horizontal bed and straddling the axle of said rear wheel, each arm having an end distal from the horizontal bed, an opening formed in each of the respective ends of each connecting arm, means for securing said openings to the axle of the rear wheel of the two-wheeled vehicle, wherein the horizontal bed of the frame is lower than said axle and said rear wheel may rotate without interference;

a pair of arms extending rearwardly and substantially horizontally from the rear end of the horizontal bed, at least a portion of each of the arms being substantially parallel to one another, said arms being pivotally connected to the rear end of the horizontal bed, wherein said arms may pivot freely about a vertical axis in a horizontal plane;

a trailing wheel having an axle, said axle being connected between the substantially parallel portions of the rearwardly extending arms, wherein the trailing wheel may rotate freely and may pivot when the arms pivot;

two modified nuts threadably attached to the axle of the rear wheel of the two-wheeled vehicle on each respective end of said axle, each nut having an outer surface having a hexagonally-shaped inner edge and a circularly-shaped outer edge, wherein when the respective nuts are attached to the axle, the circularly-shaped outer edge of each respective nut may be received in the respective openings in the ends of the connecting arms of the frame thereby securing the trailer to the two-wheeled vehicle and permitting motion of the trailer in a vertical plane about said axle, each nut having a transverse opening formed in the circularly-shaped outer edge, a respective pin means being received in each of said transverse openings, wherein the respective connecting arms of the trailer may be secured on the respective nuts between the horizontally-shaped inner edge and said pins and removal of said connecting arms is prevented.

* * * * *